United States Patent
Kim

(10) Patent No.: US 6,198,099 B1
(45) Date of Patent: Mar. 6, 2001

(54) BOLOMETER INCLUDING A REFLECTIVE LAYER

(75) Inventor: Dong Kyun Kim, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/146,254

(22) Filed: Sep. 3, 1998

(51) Int. Cl.$^7$ ................... G01J 5/00; G01J 5/20; H01L 27/14; H01L 31/00; H01L 31/08

(52) U.S. Cl. .................. 250/338.1; 250/338.4; 250/342; 338/18

(58) Field of Search ............... 250/338.1, 338.4, 250/339.11, 339.14, 370.01, 332, 342; 338/18, 15, 22 R

(56) References Cited

U.S. PATENT DOCUMENTS

| | | | | |
|---|---|---|---|---|
| 3,415,994 | * | 12/1968 | Fitti, Jr. ................... | 250/83.3 |
| 4,922,116 | * | 5/1990 | Grinberg et al. ........... | 250/495.1 |
| 5,010,251 | * | 4/1991 | Grinberg et al. ........... | 250/332 |
| 5,021,663 | * | 6/1991 | Hornbeck ................... | 250/349 |
| 5,054,936 | * | 10/1991 | Fraden ...................... | 374/164 |
| 5,286,976 | * | 2/1994 | Cole ......................... | 250/349 |
| 5,300,915 | * | 4/1994 | Higashi et al. ............ | 338/22 R |
| 5,302,933 | * | 4/1994 | Kude et al. ................ | 338/18 |
| 5,426,412 | * | 6/1995 | Tomonari et al. .......... | 338/18 |
| 5,584,117 | * | 12/1996 | Lee et al. .................. | 29/620 |
| 5,760,398 | * | 6/1998 | Blackwell et al. ......... | 250/332 |
| 5,811,815 | * | 9/1998 | Marshall et al. ........... | 250/370.06 |
| 5,831,266 | * | 11/1998 | Jerominek et al. ........ | 250/338.4 |
| 5,939,971 | * | 8/1999 | Yong ......................... | 338/15 |

FOREIGN PATENT DOCUMENTS

| | | |
|---|---|---|
| 0354369 | 2/1990 | (EP) . |
| 10111178 | 4/1998 | (JP) . |
| WO 9401743 | * 1/1994 | (WO) . |

OTHER PUBLICATIONS

PCT International Search Report, Aug. 31, 1998, PCT/KR 98/00267.

* cited by examiner

Primary Examiner—Seungsook Ham
Assistant Examiner—John Patti
(74) Attorney, Agent, or Firm—Pennie & Edmonds LLP

(57) ABSTRACT

A infra-red bolometer includes an active matrix level, a support level, a pair of posts and an absorption level. The active matrix level includes a substrate having a pair of connecting terminals. The support level includes a pair of bridges, each of the bridges being provided with a conduction line formed on top thereof, wherein one end of the conduction line is electrically connected to the respective connecting terminal. The absorption level includes an absorber with a reflective layer positioned at bottom surface thereof, a serpentine bolometer element surrounded by the absorber and an IR absorber coating formed top of the absorber. Since the reflective layer is attached at the bottom surface of the absorber, which will, in turn, eliminate the need for controlling the vertical distance between the absorption level and the active matrix level.

7 Claims, 3 Drawing Sheets

BOLOMETER INCLUDING A REFLECTIVE LAYER

FIELD OF THE INVENTION

The present invention relates to an infra-red bolometer; and, more particularly, to the infra-red bolometer having an absorber with a reflective layer formed at the bottom surface thereof.

BACKGROUND OF THE INVENTION

Bolometers are energy detectors based upon a change in the resistance of materials (called bolometer elements) that are exposed to a radiation flux. The bolometer elements have been made from both metals and semiconductors. In case of the metals, the resistance change is essentially due to a variation in the carrier mobility, which typically decreases with temperature. In contrast, greater sensitivity can be obtained in high-resistivity semiconductor bolometer elements wherein the free-carrier density is an exponential function of temperature; however, thin film fabrication of semiconductor elements for the construction of bolometers is a difficult task.

In FIG. 1, there is a cross sectional view setting forth two-level microbridge bolometer 100, disclosed in U.S. Pat. No. 5,286,976 and entitled "MICROSTRUCTURE DESIGN FOR HIGH IR SENSITIVITY", the bolometer 100 including a lower level 111, an elevated microbridge detector level 112 and sloping supports 130. There exists a thermal isolation cavity or air gap 126.

The lower level 111 includes a flat surfaced semiconductor substrate 113, an integrated circuit 115, a protective layer 116 and a thin film reflective layer 118. The substrate 113 is formed as a single crystal silicon substrate. The surface 114 of the substrate 113 has fabricated thereon conventional components of the integrated circuit 115. The integrated circuit 115 is coated with the protective layer of silicon nitride 116. The reflective layer 118 made of a metal, e.g., Pt or Au, is formed on top of the protective layer 116.

The elevated detector level 112 includes a silicon nitride layer 120, a thin film resistive layer 121 of vanadium or titanium oxide ($V_2O_3$, $TiO_x$, $VO_x$), a silicon nitride layer 122 over the layers 120 and 121 and IR absorber coating 123 over the silicon nitride layer 122. The material chosen for the thin film resistive layer 121 are characterized by a low IR reflectance together with a relatively high temperature coefficient of resistance (TCR). The IR absorber coating may be made of a Permalloy, e.g., a nickel iron alloy. Downwardly extending silicon nitride layers 120' and 122' formed at the same time as the layers 120 and 122 during make up the sloping supports 130 for the elevated detector level 112. The ends of the resistive layer 121 also continued down the sloping supports 130 embedded in 120' and 22' to make electrical contact with the lower level 111. During the fabrication process, however, the cavity 126 was originally filled with a previously deposited layer of easily dissolvable glass or other dissolvable material, e.g., quartz, polyamide and resist, until the layers 120, 120', 122 and 122' were deposited. Subsequently in the process the glass was dissolved out to provide the cavity or gap 126.

The optical properties of the bolometer 100 are achieved by the determination of the total structure. To optimize the absorption in the structure, the thickness of all the absorbing layers and the air gap distance must be controlled. In this two-level structure, the elevated detector level 112 is separated from the reflective layer 118 by the air gap. The interference properties of the reflected radiation are such that significant absorption is achieved by the range of wavelengths and air gap spacing between the reflective layer 118 and the elevated detector level 112. The detectors presently being described are intended for use in the 8–14 micron IR wavelength. As an effect of experimentation in the wavelength 8–14 microns, with air gaps of 1–2 microns and especially at 1.5 microns the absorption is relatively high across the desired wavelength spread.

The effect of gap thickness of the absorption vs. wavelength in the regions of interest are further displayed graphically in FIG. 2. It can be seen in the curve of 1.5 microns gap thickness that at 8 microns the absorption of the structure is climbing rapidly, and that is remains relatively high out to about 14 microns. The curve for a gap of 2 microns shows that at IR wavelengths of 14 microns the absorption is better.

There are certain deficiencies associated with the above bolometer 100. The air gap size has to be determined though experimentations with considerations given to the incident IR wavelength relative to the object for using the bolometer 100 and this is an extremely difficult and heavy task. Furthermore, in the manufacture of the bolometer 100, the fabricating condition for easily dissolvable glass material, with which the air gap is filled, changes according to the determined gap size, which will, in turn, make a mass production of the bolometer 100 difficult.

SUMMARY OF THE INVENTION

It is, therefore, a primary object of the present invention to provide an infra-red bolometer including an absorber with a reflecting layer formed at the bottom surface thereof.

In accordance with one aspect of the present invention, there is provided an infra-red bolometer, which comprises: an active matrix level including a substrate and at least a pair of connecting terminals; a support level provided with at least a pair of bridges, each of the bridges including an conduction line formed on top thereof, wherein the conduction line is electrically connected to the connecting terminal; an absorption level including an absorber with a reflective layer attached at bottom surface thereof, a serpentine bolometer element surrounded by the absorber and an IR absorber coating formed on top of the absorber; and at least a pair of posts, each of the posts being placed between the absorption level and the support level and including an electrical conduit surrounded by an insulating material, wherein top end of the electrical conduit is connected to one end of the bolometer element and bottom end of the electrical conduit is connected to the connection line.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
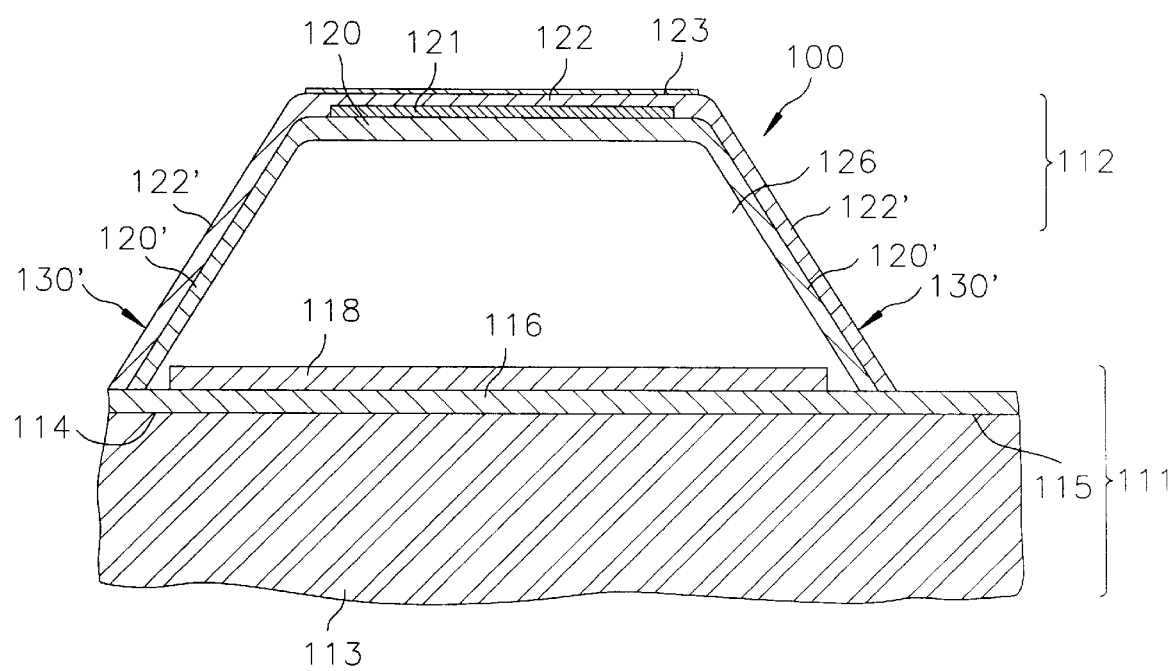
FIG. 1 is a schematic cross sectional view setting forth a two-level infrared bolometer previous disclosed.
Figure 2:
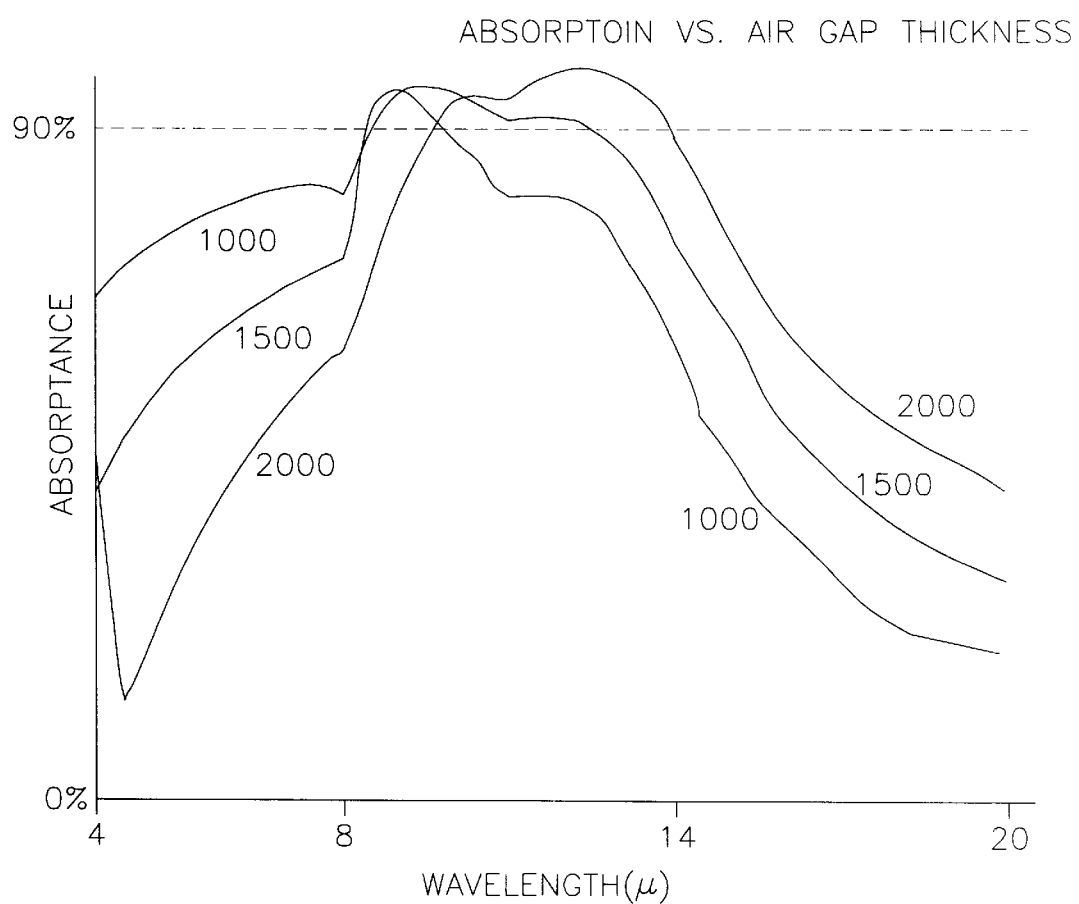
FIG. 2 shows graphically relationship between absorption and air gap thickness.
Figure 3:
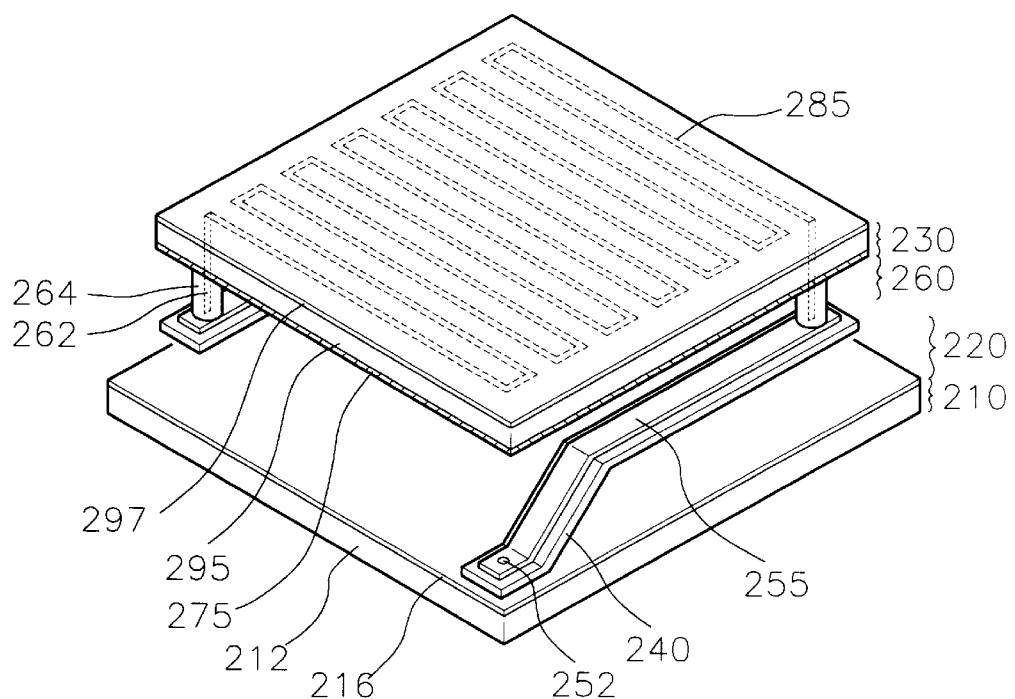
FIG. 3 presents a perspective view depicting a three-level infra-red bolometer in accordance with the present invention.
Figure 4:
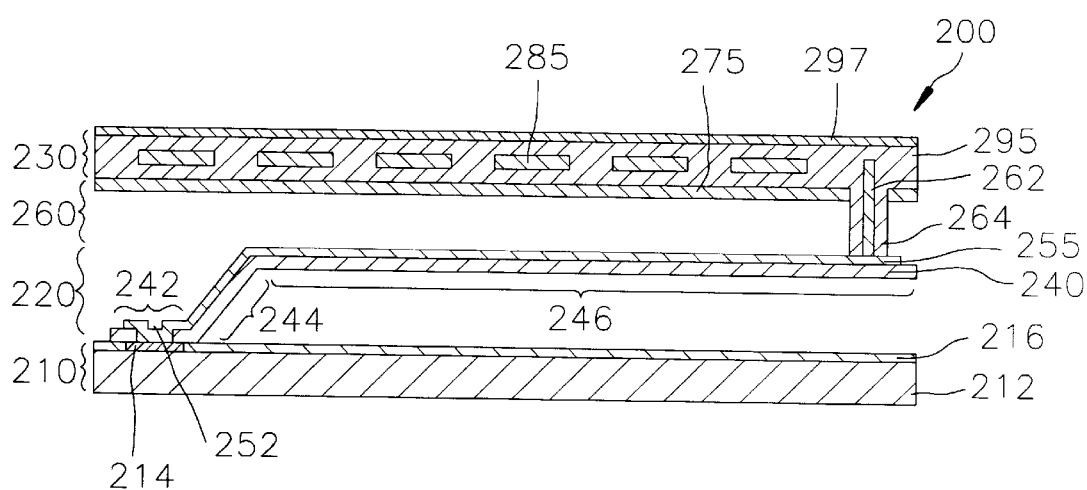
FIG. 4 provides a schematic cross sectional view illustrating the three-level bolometer shown in FIG. 3.

There are provided in FIGS. 3, and 4 a perspective view illustrating a three-level infrared bolometer 200, a schematic cross sectional view setting forth the bolometer 200 shown in FIG. 3, and a schematic cross sectional view illustrating a two-level infrared bolometer 300, in accordance with the embodiments of the present invention, respectively. It should be noted that like parts appearing in FIGS. 3, and 4 are represented by like reference numerals.

In FIGS. 3 and 4, the three-level infrared bolometer 200 comprises an active matrix level 210, a support level 220, an absorption level 230, and at least a pair of posts 260.

The active matrix level 210 has a substrate 212 including an integrated circuit (not shown), a pair of connecting terminals 214 and a protective layer 216. Each of the connecting terminals 214 made of a metal is located on top of the substrate 212. The protective layer 216 made of, e.g., silicon nitride ($SiN_x$) covers the substrate 212. The pair of connecting terminals 214 are electrically connected to the integrated circuit.

The support level 220 includes a pair of bridges 240 made of silicon oxide (SiO2) or silicon oxy-nitride ($SiO_xN_y$), each of the bridges 240 having a conduction line 255 made of a metal, e.g., Ti, and formed on top thereof. Each of the bridges 240 is provided with an anchor portion 242, a leg portion 244 and an elevated portion 246, the anchor portion 242 including a via hole 252 through which one end of the conduction line 255 is electrically connected to the connecting terminal 214, the leg portion 244 supporting the elevated portion 246.

The absorption level 230 is provided with a reflective layer 275, a bolometer element 285, an absorber 295 and an IR absorber coating 297. The IR absorber coating 297 made of, e.g., black gold, is placed on the top surface of the absorber 295. The absorber 295 is made of a material having a low heat conductivity, e.g., silicon oxide ($SiO_2$) or silicon oxy-nitride ($SiO_xN_y$). The bolometer element 285 is made of a material having a high temperature coefficient of resistance (TCR), e.g., Ti, and is surrounded by the absorber 295, wherein the bolometer element 285 has a serpentine shape to increase its resistance. The reflective layer 275 made of, e.g., aluminum (Al), is attached at the bottom surface of the absorber 295, wherein the reflective layer 275 causes the transmitted IR through the absorber 295 to be reflected, resulting the absorber 295 re-absorbing the reflected IR. The absorption by the absorber 295 without the reflective layer 275 formed at the bottom surface thereof and the IR absorber coating 297 formed on the top surface thereof is only to about 30%. With the presence of the reflective layer 275 and the IR absorber coating 297, it is possible for the absorber 295 to absorb 90% of incident IR.

Each of the posts 260 is placed between the absorption level 230 and the support level 220. Each of the post 260 includes an electrical conduit 262 made of a metal, e.g., titanium (Ti) and surrounded by an insulating material 264 made of, e.g., silicon oxide ($SiO_2$) or silicon oxy-nitride ($SiO_xN_y$). Top end of the electrical conduit 262 is electrically connected to one end of the serpentine bolometer element 285 and bottom end of the electrical conduit 262 is electrically connected to the conduction line 255 on the bridge 240, in such a way that both ends of the serpentine bolometer element 285 in the absorption level 230 is electrically connected to the integrated circuit of the active matrix level 210 through the electrical conduits 262, the conduction lines 255 and the connecting terminals 214. When the infra-red energy is absorbed, the resistivity of the serpentine bolometer element 285 is changed, wherein the changed resistivity causes a current and a voltage to vary. The varied current or voltage is amplified by the integrated circuit, in such a way that the amplified current or voltage is read out by a detective circuit (not shown).

In comparison with the bolometer 100 previous described, the reflective layer 275 is attached at the bottom surface of the absorber 295, which will, in turn, eliminate the need for determinating the vertical distance (or air gap size) between the absorption level 230 and the active matrix level 210, with respect to the incident IR wavelength. Furthermore, in the manufacture of the bolometers 200, the deposition thickness of easily dissolvable glass material can be fixed, which will, in turn, allow a mass production of the bolometer 200 feasible.

While the present invention has been described with respect to certain preferred embodiments only, other modifications and variations may be made without departing from the scope of the present invention as set forth in the following claims.

What is claimed is:

1. A three-level infrared bolometer comprising:

an active matrix level including a substrate and at least a pair of connecting terminals;

a support level provided with at least a pair of bridges, each of the bridges including an conduction line, one end of the conduction line being electrically connected to the respective connecting terminal;

an absorption level including an absorber with a reflective layer formed at a bottom surface thereof and a serpentine bolometer element surrounded by an absorber; and at least a pair of posts being placed between the absorption level and the support level, each of the posts including an electrical conduit surrounded by an insulating material, wherein top end of the electrical conduit is connected to the absorption level and bottom end is electrically connected to the other end of the respective conduction line.

2. The bolometer of claim 1, wherein the reflective layer is attached at bottom of the absorber in the absorption level.

3. The bolometer of claim 1, wherein the reflective layer is made of a metal.

4. The bolometer of claim 3, wherein the reflective layer is made of aluminum (Al).

5. The bolometer of claim 1, wherein the absorption level further includes an IR absorber coating.

6. The bolometer of claim 5, wherein the IR absorber coating is placed on top of the absorber.

7. The bolometer of claim 6, wherein the IR absorber coating is made of black gold.

* * * * *